United States Patent [19]

Browning

[11] Patent Number: 4,660,345
[45] Date of Patent: Apr. 28, 1987

[54] VEHICLE SPACE FRAME, CASTINGS THEREFOR AND METHOD FOR REMOTE CONSTRUCTION

[75] Inventor: James R. Browning, Berea, Ohio

[73] Assignee: Mr. Gasket Company, Cleveland, Ohio

[21] Appl. No.: 861,122

[22] Filed: May 7, 1986

Related U.S. Application Data

[63] Continuation of Ser. No. 659,267, Oct. 10, 1984, abandoned.

[51] Int. Cl.$^4$ .............................................. B62D 21/00
[52] U.S. Cl. ....................................... 52/648; 52/655; 164/63; 296/205; 403/171
[58] Field of Search .................... 52/646–655, 52/DIG. 10, 81; 296/203, 205; 403/171–174, 178, 192; 164/63

[56] References Cited

U.S. PATENT DOCUMENTS

| 2,669,462 | 2/1954 | Toncray et al. | |
|---|---|---|---|
| 3,623,744 | 11/1971 | Bertness | 280/106 |
| 3,806,149 | 4/1974 | Huszar | 280/106.5 |
| 3,914,060 | 10/1975 | Miller et al. | 403/171 |
| 4,011,638 | 3/1977 | Holt et al. | 403/171 |
| 4,112,997 | 9/1978 | Chandley | 164/119 |
| 4,254,987 | 3/1981 | Leonardis | 52/648 X |
| 4,259,821 | 4/1981 | Bush | 403/171 X |
| 4,340,108 | 7/1982 | Chandley et al. | 164/63 |
| 4,355,844 | 10/1982 | Muzzarelli | 296/205 |
| 4,437,288 | 3/1984 | Foissac et al. | 403/171 X |
| 4,484,429 | 11/1984 | Stephenson | 52/648 |
| 4,557,097 | 12/1985 | Mikulas et al. | 52/648 X |

FOREIGN PATENT DOCUMENTS

| 0146716 | 7/1985 | European Pat. Off. | 296/203 |
|---|---|---|---|
| 1246125 | 10/1960 | France | 403/171 |
| Ad.93978 | 5/1969 | France | 52/648 |
| 2042669 | 9/1980 | United Kingdom | 52/648 |
| 709769 | 1/1980 | U.S.S.R. | 52/648 |
| 992681 | 1/1983 | U.S.S.R. | 52/666 |

OTHER PUBLICATIONS

Three (3) loose sheets (undated) disclosing "Trek" bicycles having tubular frame construction.

Primary Examiner—J. Karl Bell
Attorney, Agent, or Firm—Body, Vickers & Daniels

[57] ABSTRACT

There is provided a remotely constructible, three dimensional space frame for a motor vehicle which comprises a plurality of elongated, metal structural members with outer surfaces and having axially uniform cross sections and a plurality of thin walled, interconnecting metal castings of at least first and second types. These metal castings each have (a) a saddle portion with a contour matching a portion of the cross section for one of the structural members and are laterally engageable with that one structure for axial movement of the casting along the structure and (b) a receptacle with an elongated tubular portion having a cross section matching the cross section of another structural member and intersecting with the saddle portion of the casting at a given angle so that the thin walled metal casting can be moved axially along one of the structural members and will receive a second structural member by movement of that second member into the casting. The two structural members are held with respect to each other at a given angle. The saddle portion and tubular portion of the many castings each have outer peripheral edges lying along the outer surface of the two structural members. A welded bead is deposited along these peripheral edges of the two casting portions and between the edges and the two structural members. In this fashion, the thin walled metal casing provides a variable junction for use with the structural members at a given joint necessary to construct the three dimensional space frame of a motor vehicle. The metal castings used in this space frame have a uniform wall thickness and are formed by a unique metal casting process wherein molten metal is drawn into a cavity of a rigid, self supporting, gas permeable low temperature bonded, sand grain mold by a vacuum applied through the sand mold while the mold is partially submerged in a bath of the molten metal.

47 Claims, 27 Drawing Figures

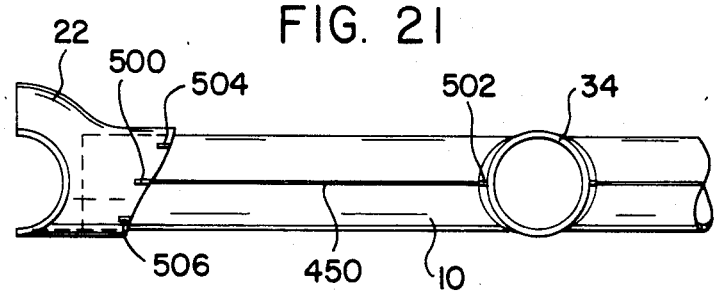
FIG. 21
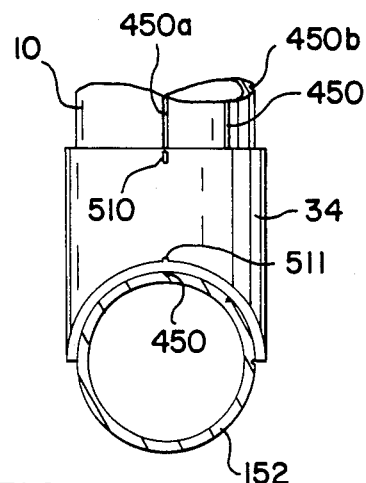
FIG. 22
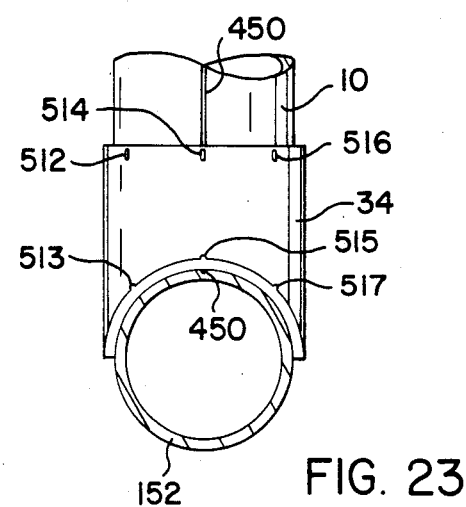
FIG. 23
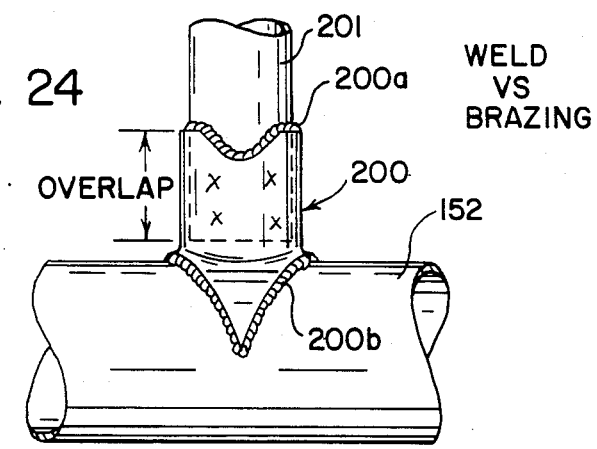
FIG. 24      WELD VS BRAZING

VEHICLE SPACE FRAME, CASTINGS THEREFOR AND METHOD FOR REMOTE CONSTRUCTION

This is a continuation of Ser. No. 659,267 filed Oct. 10, 1984, now abandoned.

The present invention relates to the art of vehicle frames and more particularly to a vehicle space frame, castings for use in constructing the frame and the method for constructing the frame at a remote location. The term remote location indicates that the frame can be constructed in various locations without the need for precise jig and fixtures and other expensive equipment.

INCORPORATION BY REFERENCE

In accordance with the present invention, thin walled interconnecting metal castings are employed for the purpose of constructing a space frame in a motor vehicle and, in accordance with one aspect of the invention, these castings are produced in accordance with a process utilizing a rigid, self supporting, gas permeable low temperature bonded, sand mold wherein a vacuum is applied through the sand mold while the mold is partially submerged in the molten metal forming the casting. The mold is also shallow in the vertical direction. This casting technique is referred to commercially as the CLAS Process which is disclosed and claimed in U.S. Pat. No. 4,340,108. This patent is incorporated by reference herein for the purpose of showing the relatively shallow type of gas permeable low temperature bonded, sand grain mold contemplated for use in accordance with one aspect of the present invention. An article entitled "Automatic Counter Gravity Casting of Shell Molds" appearing in the October 1983 issue of Modern Castings is incorporated herein for the purposes of explaining the method of making the castings utilized in practicing the present invention. Also incorporated by reference into this specification is a publication by Hitchner Manufacturing Company, Milford, N.H. entitled "Control of Fluid Flow Enhances Quality of Counter Gravity Formed Castings."

BACKGROUND

In production of motor vehicles, it is common practice to provide a lower portion referred to as the chassis or frame onto which are mounted many vertical structures necessary to support components, accessories and the body skin or outer shell of the vehicle. These frames require large steel stampings which are welded together into heavy structural members presenting tremendously costly transportation charges and other costs in transporting and shipping the chassis or frame for subsequent use in building the motor vehicle. Such chassis or frames can not be modified by user for the purpose of producing various vehicles. They are custom built and are used only for a special mass produced vehicle. An auto enthusiast embarking upon a project of building a custom vehicle is creatively restricted when using the frames or chassis of high production vehicles. For that reason, many enthusiasts involved in producing their own custom made cars, whether for street use, display or racing, have turned to a "space frame" for their vehicle. A space frame includes a plurality of elongated structural members cut into the desired length and welded together to produce a fabricated shell forming the total body support and lower frame of a vehicle. Since the length of the member, or struts, can be selected and the angles of the strut joints can be controlled, a space frame lends itself to extreme versatility and design creativity. The enthusiast can design a custom space frame, cut the structural pieces and weld these pieces together into any shape. Consequently, a tremendous amount of interest has been devoted to producing custom made space frames. These space frames are generally formed from structural elements. such as stainless steel pipes of various diameters, i.e. 1¾ inch diameter. Hereafter pipes will be referred to specifically, even though it is realized that these pipes may be replaced by other elongated structural members, such as bars, channels, etc.

Production of a space frame requires a substantial amount of skill together with sophisticated jigs and fixtures. Pipes cut to length are contoured at their ends to fit precisely in the desired joint location necessary to produce a total space frame. The individual pipes were located in a manner to be in either compression or tension, much like the truss of a bridge. The contouring of various ends of the pipes or struts, together with the control of the length of the various pipes used in the space frame was critical. Skilled persons with fixtures are needed to locate and support the pipes preparatory to welding. This process of building space frames for motor vehicles was normally done in a speciality shop where cutting, contouring and fitting of the various pipes comprising the total space frame were done by experienced workers.

The do it yourself home enthusiast could not make a space frame without substantial difficulty, tremendous waste material, and relatively high costs. For that reason, space frames have been limited to use by well financed enthusiasts or racing teams to the exclusion of the tremendous market made up of individuals who intend to make only one or two space frames.

In summary, there has been and is a tremendous need for a space frame which can be built by a motor vehicle enthusiast that does not require substantial skills nor high cost equipment, but which will result in a frame which is safe and functional.

THE INVENTION

The present invention relates to a three dimensional space frame for a motor vehicle which is remotely constructible. This means that it can be made at various remote locations without the need for special jigs and fixtures and by untrained persons, such as motor enthusiasts having only normal equipment. A person using the present invention can make a space frame for a relatively low cost, including essentially the purchase of speciality castings constructed in accordance with the present invention and standard structural elements or members, such as stainless steel pipes. By the purchase of relatively inexpensive castings, equipment to cut the pipes into the general length desired, and relatively inexpensive seam welding equipment, an enthusiast can construct a space frame having a variety of designs and the frame can be modified to accommodate many types of vehicle accessories, such as the motor, steering mechanism, shock absorbers, suspension system, etc.

In accordance with the present invention, there is provided a remotely constructible, three dimensional space frame for a motor vehicle wherein the three dimensional space frame includes a plurality of elongated, metal structural members with outer surfaces and having axially uniform cross sections, such as standard stainless steel pipes. The frame further includes a plurality of thin walled, interconnecting metal castings of at least two different types. Indeed, several casting types are provided to give versatility in the overall construction. At least two of the metal castings have a generally arcuate saddle portion with a contour matching the cross section of the pipes used and with an arc less than 180° for allowing lateral engagement of the casting with one of the pipes. The casting can move axially along the pipes. This movable casting includes a receptacle with an elongated tubular portion having a cross section also matching the cross section of the pipe. This tubular portion intersects the saddle portion at a given angle whereby the casting itself can be moved axially along one of the pipes and can receive another of the pipes in the tubular portion so that the two pipes are held at the angle built into the casting. The saddle portion and tubular portion of the castings have peripheral edges which generally overlie the outer surface of the pipes so that these edges define a welded bead path along the outer peripheral edges to secure the pipes and casting together. In this manner, a single thin walled, metal casting, formed of a weldable material, such as stainless steel, can be used with standard structural members, such as standard pipes, to form a single joint wherein the casting holds one pipe at a given angle with respect to the other pipe. This angle can be 90°, 30°, 60°, or whatever angle designed into the casting. By providing a number of these castings with various angles, a multitude of strut joints between pipes and castings can be made. The pipes are attached to the castings by elongated welded beads extending around the peripheral edges of the casting. These peripheral edges are contoured to produce a greater length of bead to produce a corresponding greater length for the welded bead holding the casting and pipes together at a joint. By obtaining a number of these thin walled metal castings, which may be purchased individually or in a kit for a particular type of space frame, a total space frame for a motor vehicle can be constructed by merely cutting standard pipe to an approximate length and using the interconnecting, thin walled metal casting to produce the desired relationship between adjacent, interconnected pipes. There is no need for controlling the exact length of the pipe or contouring the end of the pipe to produce the desired intersecting contours at any joint. The casting, constructed in accordance with the present invention, produces the desired junction and a number of these junctions or strut joints combine to hold all of the pipe sections or struts together to form a motor vehicle space frame having the desired overall configuration. Only a limited number of casting designs are needed to produce a number of space frames as long as the castings are of general application to create many strut joints.

In using the novel metal casting and standard pipes, it is possible to build a total space frame by assembling the many joints using only a few differently designed castings and then spot welding the various castings and pipes together into the desired shape. After this has been accomplished, the frame builder can compare the space frame to the desired overall appearance and then totally weld the seams between the thin walled metal castings and the various pipes extending between the castings.

By using the present invention, a relatively unskilled individual can produce an acceptable space frame. In addition, such an individual can produce a partial space frame necessary for roll bar construction in low cost racing automobiles. It is also possible to provide the necessary interconnecting castings to remote regions where there are no skilled employees or heavy machinery necessary for making motor vehicles. In this way, the present invention could be used in third world countries for the purpose of producing relatively simple motor vehicles acceptable for local use. Consequently, the present invention relates to a three dimensional space frame for a motor vehicle which can be easily produced by an individual desiring a single or limited number of vehicles or by low financed companies desiring to produce a large volume of motor vehicles at a relatively low cost and with unskilled labor and relatively simple capital equipment. In all instances, whether an enthusiast is using the present invention to produce a single space frame for a custom vehicle or a company is producing a number of space frames for relatively unsophisticated motor vehicles, the resulting space frame is as strong, durable and functional as a high cost, heavy sheet metal frame. Also, the present invention, since it is a space frame, provides the necessary structural members for constructing the upper portion of the motor vehicle, whereas a standard vehicle chassis and frame usually requires bulkheads to be welded onto the lower frame for the purpose of providing the necessary support structures onto which the body panels are placed.

In accordance with another aspect of the present invention, the metal castings are formed by a specific casting process disclosed in U.S. Pat. No. 4,340,108. This unique casting process can be defined as including the concept of vacuum drawing molten metal into a cavity of a rigid, self supporting, gas permeable low temperature bonded, sand grain mold. The vacuum is applied through the gas permeable, sand grain mold which mold is relatively shallow. A plurality of metal inlets are provided in the lower portion of the sand mold where the cavities are arranged in a horizontal plane. In this manner, the high permeability bonded sand grain mold can be subjected to a relatively low vacuum, which vacuum acts over a relatively large area to draw molten metal rapidly into the relatively shallow mold. In accordance with the preferred embodiment, stainless steel is used. The stainless steel can be held at a low temperature somewhat near its solidification temperature. When the steel is drawn into the shallow mold after the mold is brought into the molten stainless steel, the gas is evacuated through the low temperature sand mold and the castings are solidified quickly before the sand mold deteriorates. This produces, at economic costs, the castings used in the present invention. Heretofore only by ceramic investment casting processes, which is economically prohibitive could thin walled castings of steel or other structurally strong metals be produced. Such processes have not produced thin walled fine grained castings needed to form the intersecting joint of a three dimensional space frame of a motor vehicle. Such castings are subjected to tremendous stresses and must withstand such stresses over many years. The novel castings have a uniform wall thickness so that the walls are solidified simultaneously from the low temperature stainless steel. By producing castings in accordance with this process, the castings can be formed from steel and other ferrous material which is not super heated and without creating the possibility of gas entrapment often encountered when high strength ferrous material, such as stainless steel, is cast in ceramic investment casting molds. The term thin walled means generally less than 0.20 inches and preferably less than 0.10 inches. By producing castings having the characteristics of the present invention with thin walled structure, they can be rapidly formed at an economic cost while having the desired strength to function as a junction device for strut joints in a motor vehicle space frame.

In accordance with another aspect of the present invention, the novel castings described above are provided with peripheral edges at their pipe receptacles and at their tubular portions. These edges are elongated to produce a greater peripheral length to accommodate a longer weld bead joining the casting and structural members or pipes. The structural members or pipes and the novel castings are affixed to each other by welding along the peripheral edges of the castings. In this manner, the castings can be spot welded for temporary assembly of the space frame and, thereafter finally welded over the total length of the seam between the peripheral edges of the casting and the structural members. By providing this novel welding feature, a three dimensional space frame can be constructed easily. This concept is different from an arrangement wherein a casting has an inner cylindrical bore to match the outer cylindrical portion of a pipe so that the cylindrical interface can be brazed or silver soldered. Such arrangements depend upon a large interface area and must be finally joined at once. This distinguishes the novel space frame concept from brazing of two dimensional structures in a furnace using investment castings such as done in expensive bicycle construction. The present invention relates to a special casting having a novel structure that allows it to be used to construct a three dimensional space frame with standard structural elements or members such as pipes. The lengths of the struts are not critical nor is the cylindrical fit. Consequently, standard pipe purchased from any source can be used with the castings of the invention. The cylindrical surface of the casting is close enough to hold the pipe for the welding operation. This is not true in brazing.

In accordance with another aspect of the present invention, there is provided a method of making a three dimensional vehicle space frame from a plurality of elongated structural elements or members, such as off the shelf, standard pipe. In this method, a plurality of thin walled, interconnecting metal castings with at least one tubular receiving portion and one portion to be secured onto the pipe are used. A structural member, such as a pipe, is cut into a useful length. One of the castings is placed on the structural member and another structural member is inserted into the tubular portion of the casting. After temporary tacking, the method involves welding the castings and structural members together at seams defined by the intersection of the casting and the pipes. By using this method, a relatively unskilled person can use standard pipe with little equipment beyond a hack saw and a welder to construct a high integrity, well designed, efficient, and attractive space frame.

Several other aspects of the present invention are used in constructing a space frame using the novel castings and interconnecting arrangements defined above. These various aspects will be appreciated after considering the preferred embodiment of the present invention.

The primary object of the present invention is the provision of a novel construction for a vehicle space frame where the frame can be assembled remotely, i.e. away from a professional shop having highly trained employees and expensive equipment, by persons with limited experience and only readily available domestic type equipment.

Another object of the present invention is the provision of a novel vehicle space frame construction which construction allows use of a technique involving low cost and low equipment demand. This concept can be used for mass production of motor vehicles in remote locations where sophisticated industrialization has not yet occurred or can be used to provide the safety features of a space frame for domestic mass produced motor vehicles. In this manner, the space frame concept of the type used to protect occupants in racing vehicles can be used for custom vehicles or for mass produced motor vehicles.

Still a further primary object of the present invention is the provision of a space frame construction, as defined above, which space frame uses off the shelf standard, readily available, low cost structural members, such as stainless steel or other type pipes. By using such standard structural members, the primary strut or truss members for the space frame can be purchased locally. The novel space frame can be sold in the form of a kit having a number of junction castings, to be described later, with a few standard structural shapes and useable with standard pipes.

Another object of the present invention is the provision of a novel construction for a vehicle space frame using thin walled, metal castings at intersections of struts or pipes forming the space frame itself. These thin walled metal castings have to have the structural strength, appearance and dimensional stability necessary for assembly into a complex space frame. Castings having these characteristics formed from strong material, such as stainless steel, have not been economically available even when using such highly proficient casting techniques, such as investment casting.

Still a further object of the present invention is the provision of a novel construction for a vehicle space frame wherein the thin walled metal castings, as described above, are made available by being formed in a process that involves drawing molten metal from a molten metal bath into a cavity of a rigid, self supporting gas permeable low temperature bonded, sand grain mold by a low vacuum applied through the sand grain mold itself. This unique process for forming the thin walled metal castings envisioned in accordance with the present invention uses a low vertical height with a number of individual vertical gate passages and a single array of casting cavities in a given horizontal plane whereby low vacuum can draw molten metal rapidly into the individual cavities when the mold is partially submerged into the molten metal bath. The individual gates leading to the cavities have a small cross section allowing metal to solidify the individual gates in a matter of a few seconds. Rapid solidification of the various castings employed in the present invention occurs before the structurally weak sand mold fails. By using this type of process, it is now possible to produce a space frame for general and specific use incorporating the advantages of space frame construction without the high cost and expertise generally associated with production of space frames. The process set forth for making the novel castings allowing the adaptation of space frame construction to the specific and general use is taught in more detail in U.S. Pat. No. 4,340,108, incorporated by reference herein. The present invention contemplates the use of stainless steel castings with stainless steel pipes; therefore, another object of the invention is the construction of a space frame for a vehicle having the characteristics defined above and employing stainless steel for both the castings and strut or truss members. By producing the castings in accordance with the process mentioned above, the castings can be thin walled, i.e. less than 0.20 inches. Such castings can be economically produced with a grain size, strength, integrity and appearance required in making a vehicle space frame in accordance with the broader aspects of the present invention described above.

Yet another object of the present invention is the provision of a method of making a vehicle space frame, which method allows an inexperienced person with normal domestic equipment to make a space frame having all structural features of a usual vehicle frame, plus having upper supporting structures joined in truss fashion for the purpose of supporting vehicle accessories and the outer skin of the vehicle itself. Such a space frame, in accordance with the present invention, can also be employed for mass production of vehicles in remote locations, such as under-developed low industrialized countries by obtaining lightweight, thin walled metal castings constructed in accordance with the present invention and using these castings with standard struts or truss members, such as standard pipes.

Still a further object of the present invention is the provision of a thin walled metal casting forming a junction member between two or more structural members, such as pipes, which structural members are cut to a general length and have no special end contouring necessary to match one pipe to the other. By this advantage, the skill necessary in assembling the space frame is drastically reduced.

Yet a further object of the present invention is the provision of a thin walled casting, as defined above, which casting is welded to the pipes or other structural members by a welded bead around peripheral edges of the casting. These edges overlie and are adjacent to the outer surfaces of the various pipes. It is possible, in accordance with another aspect of the present invention, to tack the strut joints of the space frame together by an adhesive or by a weld nugget. After total assembly, the various peripheral edges of the castings can be fixed to the pipes by a welding process.

A further object of the present invention is the provision of a novel vehicle space frame that provides the strength of a space frame without requiring special cutting and/or trimming of the truss members used in forming the frame. In this manner, mass production of domestic vehicles can use the occupant protective advantages of a space frame for no more cost than the normal chassis and bulkhead units or unitary bodies now used.

In accordance with still a further object of the present invention, a novel space frame is provided together with novel castings used in constructing the space frame which resulting space frame is sufficiently protective of vehicle occupants to be used in racing vehicles but is still low enough in cost and needed assembly equipment to be assembled by an amateur.

Yet another object of the present invention is the provision of a space frame and a set of standard castings therefor, which space frame is sufficiently protective of a vehicle occupant to be used in a racing vehicle, but still is low enough in cost to be used in mass producing automobiles.

Another object of the present invention is the provision of a novel casting structure which is low cost, strong, pleasing in appearance and can be sold individually or in a kit form for the construction of a standard space frame or for custom made space frames.

These and other objects and advantages will become apparent from the following description taken together with the accompanying drawings which are described in the next section.

BRIEF DESCRIPTION OF THE DRAWINGS

FIG. 21 is a side elevational view showing the use of the scribed lines or marks produced in accordance with the structure shown in FIGS. 18-20 or other appropriate scribing or marking structures;

FIG. 22 is an enlarged cross sectioned view showing a partial pipe mounted in a casting constructed in accordance with the present invention wherein the pipe has scribed axial lines and the casting has an appropriate indicia;

FIG. 23 is a view similar to FIG. 22 wherein the pipe has a single axial line and the novel casting has a plurality of indicia for the purposes of orientation between the pipe and the casting;

FIG. 24 is a side elevational view showing certain features used to join two pipes by a casting in accordance with the present invention, as compared to a brazing process;

PREFERRED EMBODIMENT

Figure 1:
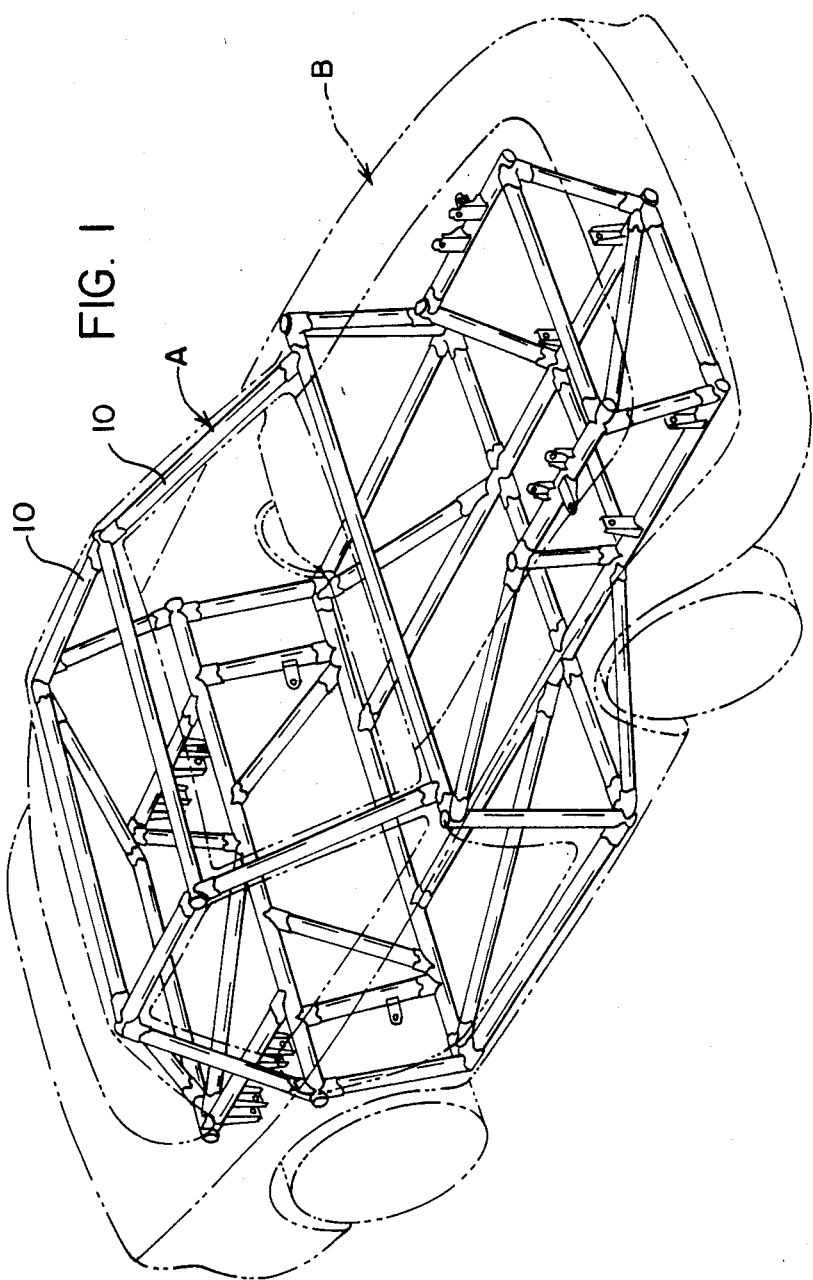
FIG. 1 is a pictorial view of a space frame constructed in accordance with the present invention employed in a standard motor vehicle, such as 1984 Chevrolet Corvette.

Referring now to the drawings wherein the showings are for the purpose of illustrating the preferred embodiment of the invention only, and not for the purpose of limiting the same, FIG. 1 illustrates a three dimensional space frame A forming both the frame, supporting structure for accessories and supports for an appropriately contoured body B shown in phantom line as a Chevrolet Corvette. The space frame is a series of truss or elongated structural members or elements 10, shown as stainless steel pipes, having different lengths according to the particular truss and support arrangement desired. The truss members are held together in angular relationship to exert either compression or tension on pipe sections 10 by a plurality of novel thin walled metal castings also having a variety of novel design characteristics. In the illustrated embodiment of the space frame, best shown in FIG. 2, at one strut joint three thin walled metal castings 20, 22. 24 are welded together to form a unitary juncture involving three or four different pipe sections 10. This juncture is welded into an integral structure by welding the various stainless steel castings 20, 22 and 24 together with the appropriate pipe sections 10 as shown in FIG. 3. Other standard castings employed in the construction of space frame A are castings 30, 32 and 34 shown in more detail in FIGS. 7, 8 and 9, respectively. As can be seen, a plurality of identical castings are employed at various locations to construct the total space frame. Construction can be done at some remote location where standard pipe sections 10 can be cut into desired lengths and assembled with the standard castings. By welding the various joints together a fixed integral space frame is produced having the desired truss arrangement to make the space frame rigid and adapted to support the various components, accessories and body panels of a complete motor vehicle as shown in FIG. 1. By providing appropriate standard castings and obtaining standard pipe, a person with little skill can assemble a space frame without complex and expensive equipment or without needing expertise in cutting the pipe lengths 10 extremely accurately and then contouring the ends of the pipes so that they can be welded together. This is possible by using the novel intermediate, standard thin walled castings having the strength necessary to unitize the total structure into a fixed body sufficient for use in a motor vehicle. As has been explained, the castings are formed of a thin metal wall having a thickness of approximately 0.06 to 0.09 inches. By forming the casting into uniform wall thicknesses, all of the casting solidifies simultaneously in the casting process. This produces desired grain size, allows low temperature for the cast metal so that it need not be super heated, and results in an inexpensive, strong, casting sufficient to be welded to stainless steel pipe sections 10, shown in FIGS. 1 and 2. This same casting process, wherein thin walled stainless steel or similar metal is cast into uniform wall thicknesses and complex shapes is used for various accessory and component mounting brackets generally illustrated as brackets 40 in FIG. 2. Some of these brackets will be described in more detail later; however, they have uniform, thin walled thickness so that they can be simultaneously hardened in the low vacuum, gas permeable low profile molding process anticipated in accordance with the present invention and as already described in detail, but illustrated generally in FIG. 25. A set of individual castings, many being duplicates, can be assembled into a kit together with a plan to make a space frame. A purchaser of the kit receives an appropriate number of castings in both junction and bracket form, together with a drawing or layout indicating the general size of the pipe sections to be used. Thereafter, the pipe sections are cut by hand with a normal hack saw and assembled with the castings into the desired shapes. In doing this, each of the various castings and pipes may be temporarily locked together with an adhesive or by spot welding. After the frame has been aligned, squared, and profiled to the desired pattern, then final welding of the pipes and castings can be done quickly with only a standard welding apparatus available to most people and surely available to a person involved in constructing a space frame for a custom or racing vehicle. Only a limited number of different castings need be provided; however, the desired number and types of castings can be changed according to the particular construction of the space frame. This space frame construction does not require complex stamped chassis members or other heavy components which can not be manipulated and easily assembled at a remote location. By using the castings constructed in accordance with the present invention, with standard pipes or other structural members, the pipes can be assembled in a truss fashion to produce a rigid space frame constructed similar to a roll cage used in adapting street cars for racing purposes. Of course, a large number of space frames could be made at the same time without a substantial amount of capital expenditure and, at remote areas where there are no jigs and fixtures and/or skilled personnel.

Figure 2:
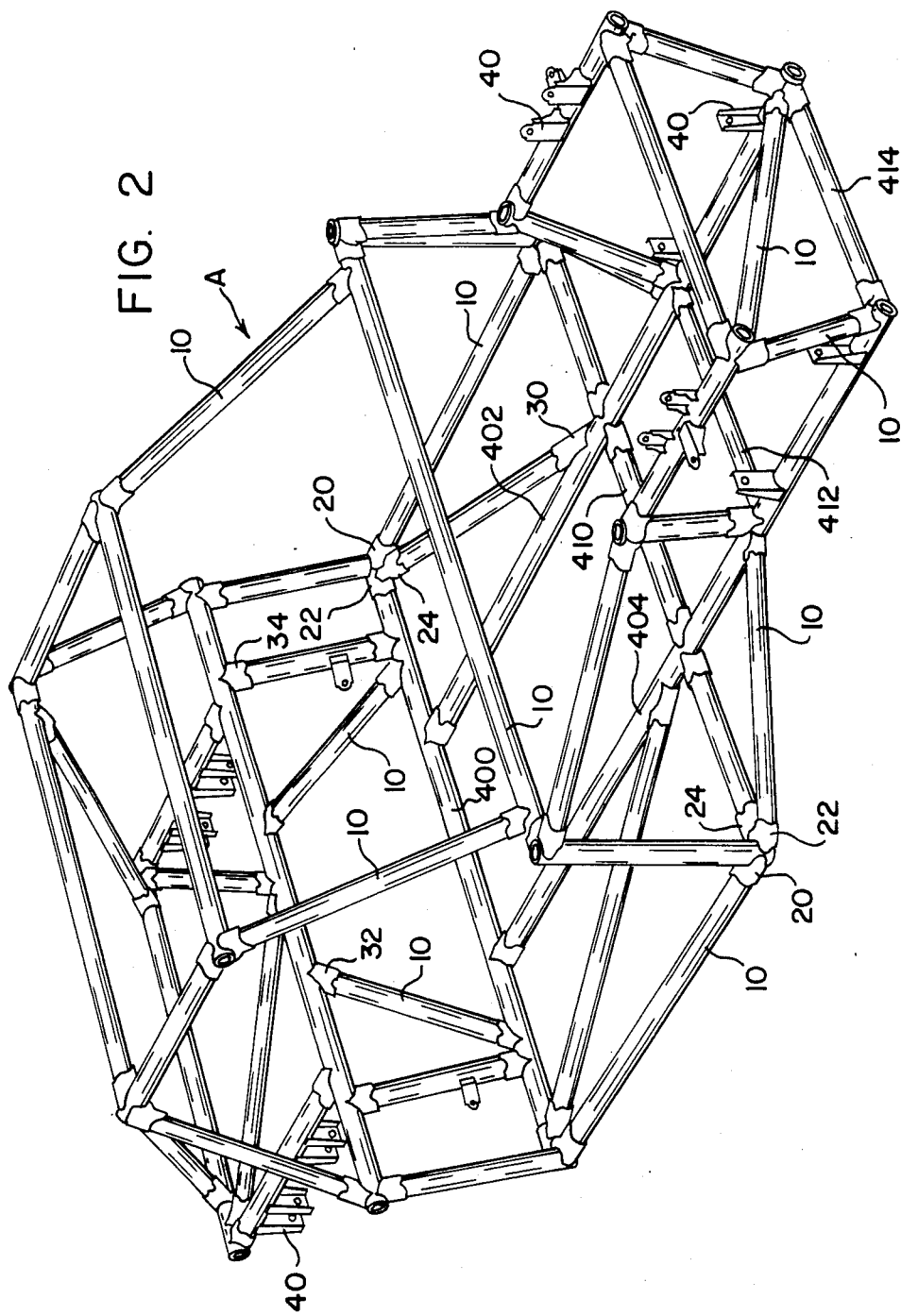
FIG. 2 is an enlarged pictorial view of the novel space frame construction shown in FIG. 1.
Figure 3:
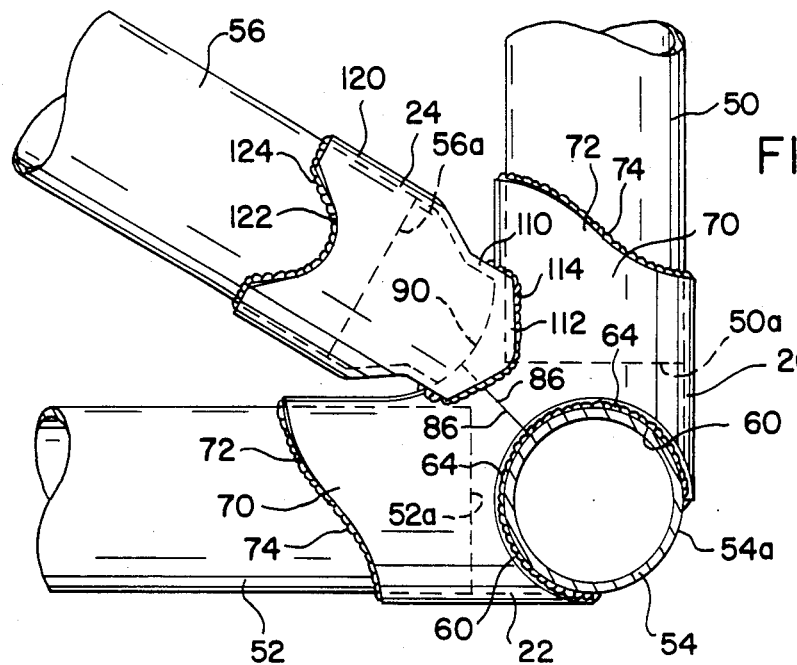
FIG. 3 is an enlarged view showing three thin walled castings constructed in accordance with the present invention and employed for the purpose of joining three or four structural members, such as pipes, into a single junction or joint in the space frame illustrated in FIGS. 1 and 2.
Figure 4:
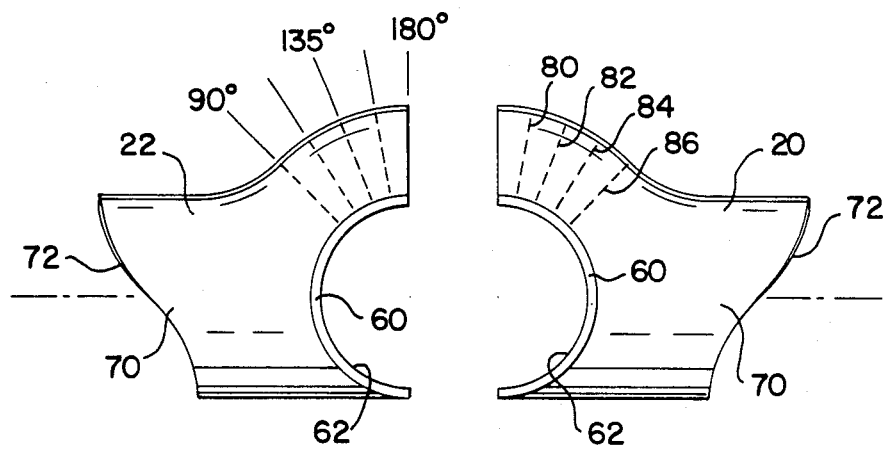
FIG. 4 is an enlarged side elevational view of two castings used in forming the pipe junction illustrated in FIG. 3.

Referring now to FIGS. 3-6, thin walled castings 20, 22 and 24, which are welded together to form a unitary, multiple pipe juncture, shown in FIG. 2, are illustrated in more detail as forming a junction between pipes 50, 52, 54 and 56 wherein the cut ends 50a, 52a and 56a of pipes 50, 52, and 56, respectively, are shown in dashed lines. The pipes are cut into the desired lengths and fitted into the various thin walled castings for mounting onto pipe 54. To form this particular type of joint in the construction of space frame A, the castings 20, 22 have a unique design. These castings are used in pairs and have identical configurations; therefore, only casting 20 will be described in detail and this description will apply equally to the companion casting 22. As in the case of other standard castings, casting 20 has a saddle portion 60 which engages the outer surface 54a of pipe 54. A peripheral edge 62 engages the outer surface so that the casting can be moved or slid axially along the pipe to any desired location during assembly. Edge 62 forms the intersection line between the outer surface of pipe 54 and casting 20. As can be seen, this peripheral edge of saddle portion 60 can be moved transversely into engagement with pipe 54 and can be moved longitudinally along the pipe after such engagement. This renders the casting movable along at least one pipe section 10 as shown in FIG. 2. Casting 20 also includes a tubular portion 70 having an internal cross sectional shape matching, but slightly larger than the external surface of pipe 50. In the illustrated embodiment, pipes 50, 52 have the same sized cylindrical outer surface; therefore, the inner uniform cross sectional shapes of tubular portions 70 are the same and extend toward the center line of pipe 54 when the castings 20, 22 are assembled as shown in FIG. 3. Tubular portion 70 includes an outer peripheral edge 72 so that when a pipe is axially moved into this tubular section, peripheral edge 72 defines the intersection between the casting and the surface of the pipe. This peripheral edge allows joining of the tubular portion with pipe 50 by an appropriate weld bead 74 at the overlapping line between the edge 72 and the pipe surface. In accordance with an aspect of the invention, the peripheral edge 72 has a length substantially greater than the length that would be obtained if the edge were in a plane perpendicular to pipe 50. By undulating and lengthening the peripheral edge 72, the weld bead 74 is increased in length thus producing further strength in the mechanism for holding the pipe and casting together. By making bead 74 into an elongated path, there is less tendency for bending and stress concentration at the welded bead. A similar welded bead 64 joins peripheral edge 62 of saddle portion 60 onto pipe 54. These particular castings 20, 22 have a saddle portion with a relatively short weld bead 64 since it must be paired together and moved axial along the pipe, as shown in FIG. 3.

Figure 5:
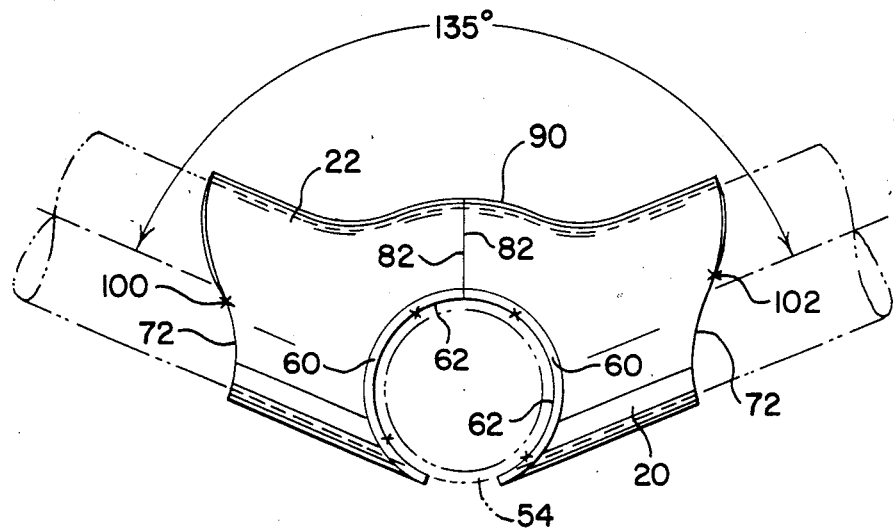
FIG. 5 is a side elevational view of the castings illustrated in FIG. 4 trimmed to allow two pipes to be assembled at a 135° angle.

In accordance with another aspect of the invention, the paired castings 20,22 have a plurality of radially extending indicia 80, 82, 84 and 86 which can be cut away or trimmed by an appropriate tool, such as a hack saw, to allow a person constructing the frame to select the angle between pipes 50, 52. In the embodiment shown in FIG. 3, castings 20, 22 are cut along line 86, which produces the minimum angle of 90°. Should the desired angle between pipes 50, 52 be at a different obtuse angle, such as 135°, castings 20, 22 would be cut or trimmed along lines 82, as shown in FIG. 5. This figure also illustrates the concept of tacking the two castings onto pipe 54 by weld nuggets 100, 102. This tacking procedure can be done to temporarily hold the various castings in place until the total space frame has been constructed, after which the weld beads along the peripheral edges of the various casting portions are applied to unitize the total frame.

Figure 6:
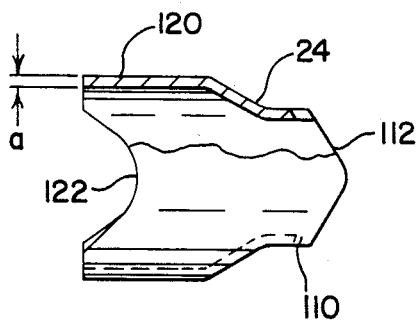
FIG. 6 is a partially cross-sectioned view of one of the thin walled castings illustrated in FIG. 3 showing the elongated peripheral edge constructed in accordance with one aspect of the invention and showing the uniform wall thickness for the casting.

FIG. 6 illustrates casting 24 with a wall thickness a which is uniform over the total thin wall casting. In practice, thickness a is preferably 0.06-0.09 inches. Uniformity of the wall thickness, together with the thin nature of the wall thickness, allows the casting to solidify simultaneously. Consequently, using the process previously discussed and illustrated in more detail in U.S. Pat. No. 4,340,108 to produce uniform, thin walled castings having the characteristics so far described results in an inexpensive casting having the desired welding characteristics and the structural strengths necessary to assemble standard pipe into a free standing unitary space frame. Casting 24 has a saddle end or portion 110 with a peripheral edge 112 defining an intersection with the surfaces of castings 20, 22 and an appropriate weld bead 114, shown in FIG. 3. Again, the peripheral edge 112 has an extended length. In this instance the length of edge 112 forms a saddle around a hump 90 in the outer surface of paired castings 20, 22. Casting 24 also includes a tubular portion 120 for receiving pipe 56 having a cut end 56a. Peripheral edge 122 has two concaved portions to increase the length of the peripheral edge and the path defined by its intersection with the surface of pipe 56 so that a weld bead 124 has a relatively long length and is not in a perpendicular plane extending through the pipe. As mentioned before, this longer length and contoured shape for the casting edges rigidify the welded junction and reduce stress concentration areas in the pipe.

Figure 7:
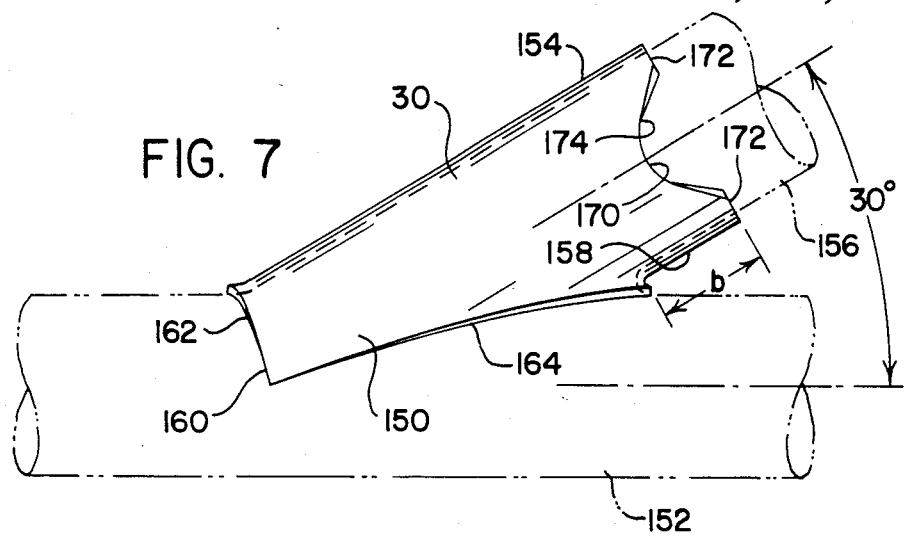
FIG. 7 is a side elevational view showing a different casting constructed in accordance with the present invention to join two pipes shown in phantom lines at a preselected angle, i.e. 30°.
Figure 8:
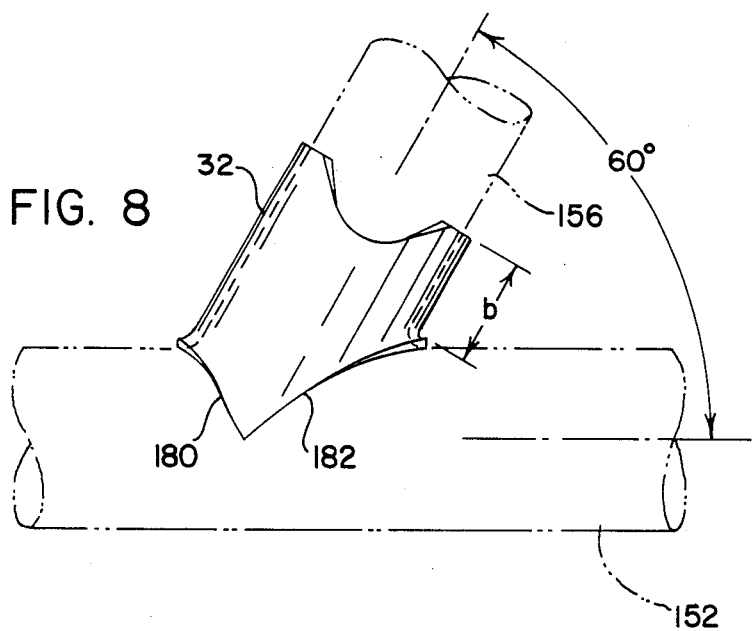
FIG. 8 is a view similar to FIG. 7 illustrating a casting constructed in accordance with the present invention having a different angle, i.e. 60°.
Figure 9:
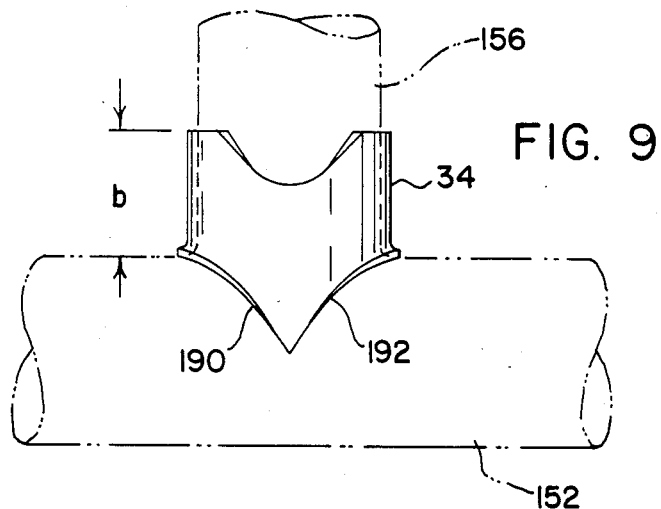
FIG. 9 is a side elevational view similar to FIGS. 7 and 8 illustrating still a further pipe angle of 90°.

Referring now to FIG. 7, angled casting 30 is shown in more detail. This casting is a thin walled casting having a generally uniform thickness throughout its total body. The casting has a saddle portion 150 movable axially along pipe 152 to the desired location and movable circumferentially around the pipe to the desired location. A tubular pipe receiving portion 154 is adapted to receive, in an axial direction, pipe 156. In accordance with the present invention, the tubular portion has a section 158 which is tubular in crosssection and has a length b which is at least about 1.0 inches when a 1¾ inch stainless steel pipe is employed. Of course, the length of this tubular section shouldbe increased for the purpose of providing more stability at the intersection between the casting and pipe 156. A peripheral edge 160 of saddle portion 150 is divided into a generally vertical component 162 and a generally horizontal component 164. These components are selected so that the saddle portion extends about 180° around pipe 152, as shown schematically in FIG. 15. Since casting 30 is to be moved transversely against pipe 152, peripheral edge 160 is the maximum length to produce a peripheral edge extending over about 180° of the surface of pipe 152. This maximizes the length of weld bead laid along the peripheral edge to join casting 30 to the outer cylindrical surface of pipe 152. Edge 160 is divided into generally orthogonal portions 162, 164 extending around and along pipe 152. Casting 30 fixes an angle between pipes 152, 156 which, in this casting, is 30°. In FIG. 8, casting 32 has a cylindrical portion with a length b and a modified peripheral edge divided into edge portions 180, 182. These portions define the intersection between casting 32 and pipe 152 onto which the casting rests for the purpose of creating the weld bead area used in joining the casting to the pipe. Casting 32 differs from casting 30 by having an included angle of 60° for the finally joined pipes. FIG. 9 shows casting 34 with a peripheral weld bead created edge in portions 190, 192, which edge portions are of the same length since the included angle between the pipes is 90°.

Figure 10:
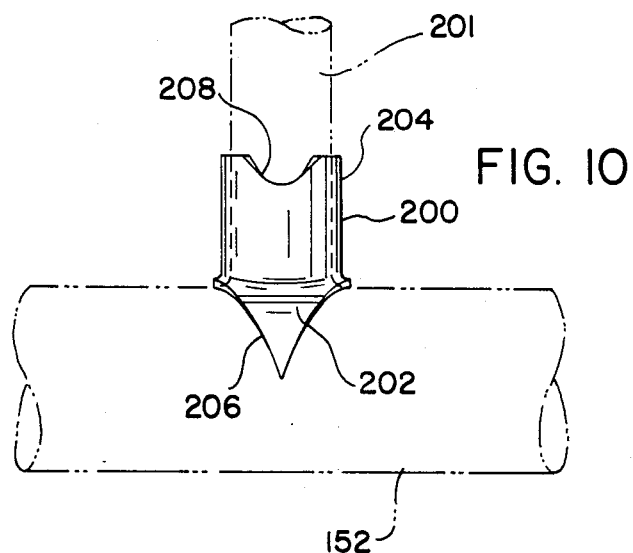
FIG. 10 is a side elevational view of a casting constructed in accordance with the present invention similar to FIG. 9 illustrating the concept of a casting having a different sized integral tubular portion.

Referring now to FIG. 7, which discussion also relates to the embodiments of FIGS. 8 and 9, peripheral edge 170 of the angled cylindrical portion 154 has four components, two of them right angled portions 172 and two of them concaved portions 174. This contouring of the peripheral edge enlarges the weld bead length, and distributes stresses created between the pipe and casting at the welded areas. FIG. 10 shows a small casting 200 similar to the casting shown in FIG. 9 in that it holds pipe 201 perpendicular to pipe 152. This particular casting has a saddle portion 202 and a tubular portion 204. The portion 204 has a reduced internal diameter so that pipe 201 can have a smaller diameter than pipe 156 shown in FIGS. 7-9. These views illustrate the versatility and the type of changes which can be made in various castings for use in customizing a space frame for general or specific vehicle construction.

Figure 11:
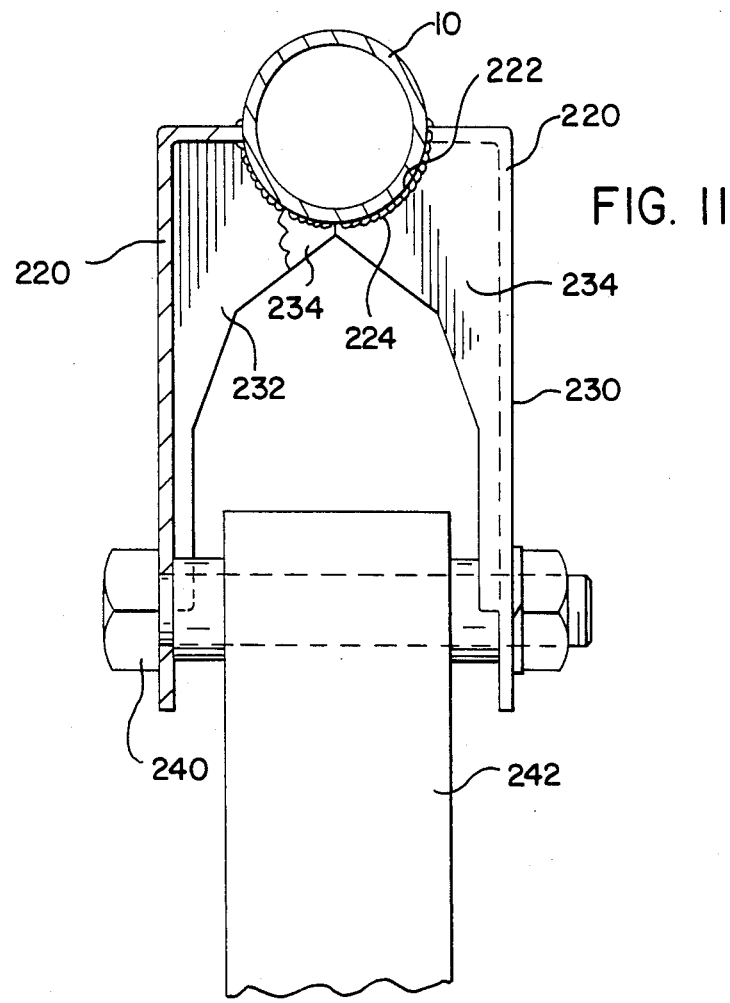
FIG. 11 is a partial view illustrating castings constructed in the form of a pair of hangar brackets employed for accessories utilized in constructing a space frame as illustrated in FIGS. 1 and 2.
Figure 12:
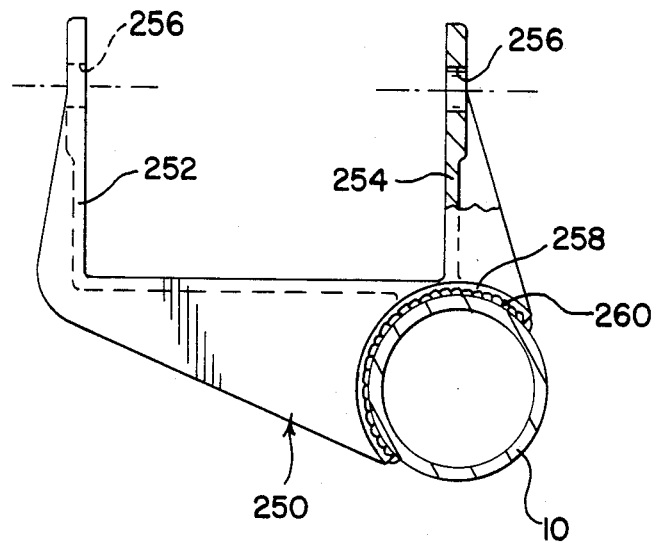
FIG. 12 is a partially cross-sectioned end view showing another thin walled casting constructed in accordance with the process of making castings in the present invention and adapted for use to assemble an accessory onto the space frame illustrated in FIGS. 1 and 2.

In FIG. 11, a pair of brackets 220 are formed together as uniform, thin walled castings using the previously described technology. These brackets are the same; therefore, only one bracket will be described. Saddle portion 222 engages pipe section 10 and defines an elongated weld bead 224 extending both circumferentially and axially of the pipe. An outboard vertical plate 230 terminatesin axially spaced end walls 232, 234. An appropriate hangar bolt 240 is supported by the bracket pair and supports an appropriate suspension or shock absorber 242. This type of two casting bracket is shown for illustrative purposes only. Another bracket 250 is shown in FIG. 12. This bracket has legs 252, 254 with appropriate holes 256. A saddle portion 258 engages pipe section 10 and is welded in place by weld bead 260.

Figure 13:
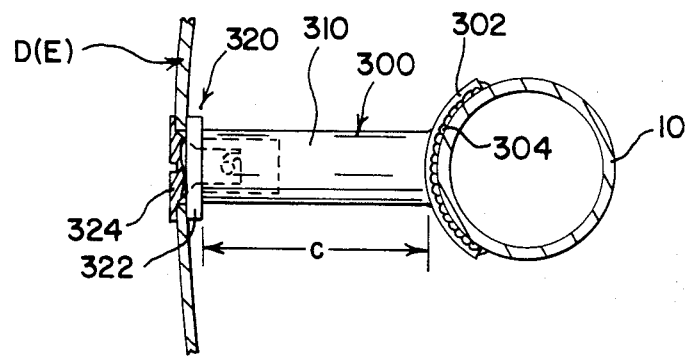
FIG. 13 is a side elevational view showing a body hanging bar constructed in accordance with the process of making castings for the space frame of the invention and used for the purpose of assembling a body shell onto a space frame as shown in FIGS. 1 and 2.
Figure 14:
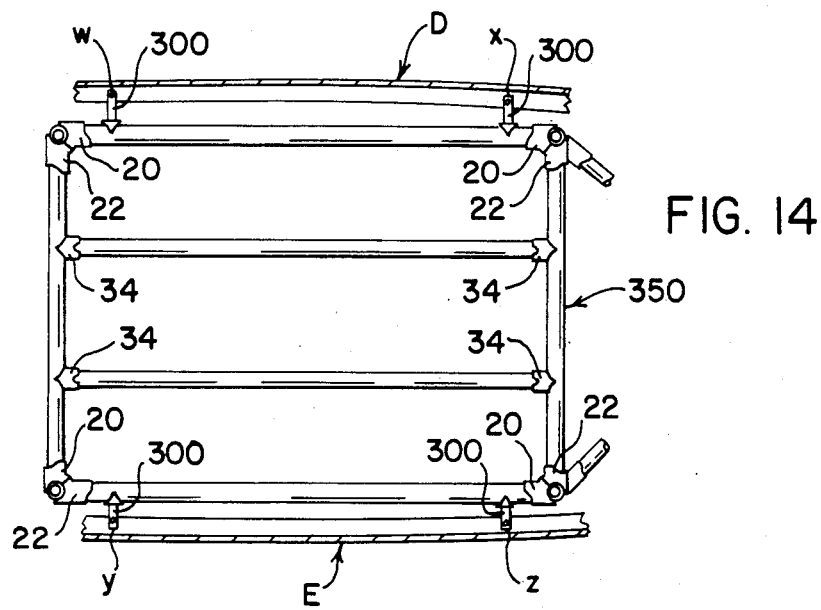
FIG. 14 is a top plan view of a space frame showing the use of a plurality of body hanging bars of the type shown generally in FIG. 13.

FIGS. 13 and 14 illustrate a unique use of the invention for supporting body panels D, E. A hollow tubular casting 300, with a saddle portion 302 engaging pipe section 10, is held in place by weld bead 304. This saddle portion is similar to portion 202 shown in FIG. 10. Hollow shaft 310 is cut to a desired length c to produce an opening at the outboard end for an appropriate fastener 320. This fastener is standard and has an internal female portion 322 and an external male head or portion 324. This standard type of connection or fastener allows panel D(E) to be placed in position and locked there by turning external head or portion 324. FIG. 14 shows a plurality of body mounting castings 300 mounted on a lower portion 350 of the space frame shown in FIGS. 1 and 2. Castings 300 are first secured onto the lower portion 350 and then are cut or trimmed to the desired length so that body locator points w, x, y and z are established. In this manner, the body panels for the automobile shown in FIG. 1 can be accurately located with respect to the space frame. This concept gives versatility and ease in securing the body panels onto the space frame so the body and the frame of the vehicle can be correlated by having assembly points w, x, y and z.

Figure 15:
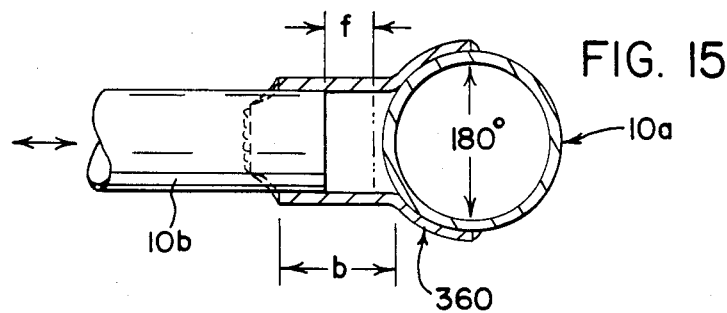
FIG. 15 is a plan view of a casting constructed in accordance with the present invention and illustrating certain advantages of assembling casting onto a pipe and for receiving a pipe in the tubular portion of the casting.

FIG. 15 is a schematic view illustrating a casting 360 joining two pipes 10a, 10b. As can be seen, the distance f at the end of pipe 10b can vary substantially in view of the length b of the cylindrical portion of the casting. This view illustrates that the cutting of the pipe sections 10 to length is not critical and it need not be done with extreme accuracy or with complicated equipment. The overlapping portion of pipe and casting gives joint stability and the weld bead provides the attaching strength by holding the pipe in the casting. This concept allows ease in assembling the space frame together which is not possible by brazing or other techniques that require jigs and fixtures.

Figure 16:
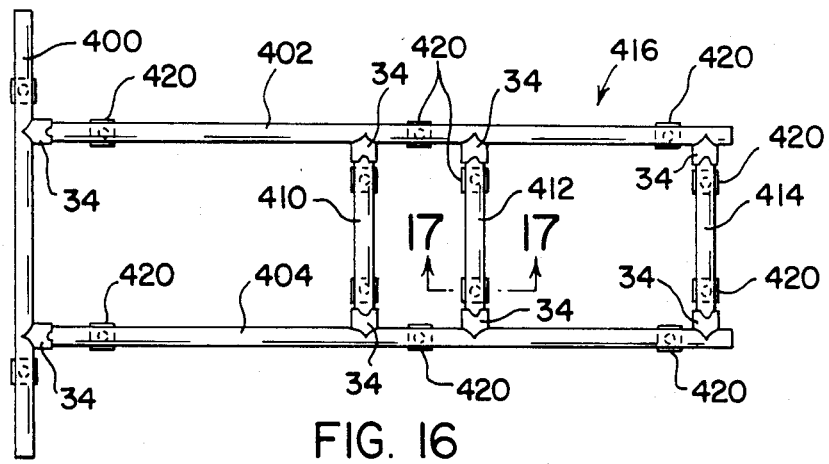
FIG. 16 relates to a novel arrangement for constructing a datum frame without a surface plate for the building of a space frame as illustrated in FIGS. 1 and 2 and utilizing the novel concepts of the present invention.
Figure 17:
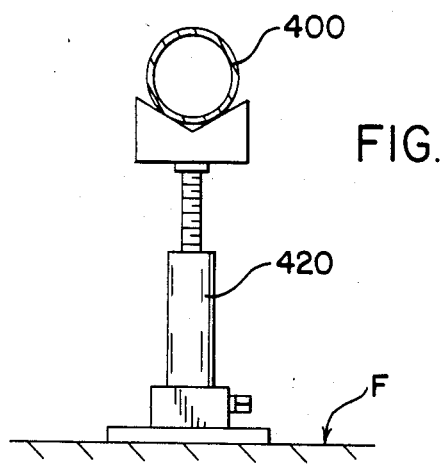
FIG. 17 is an enlarged cross sectional view taken generally along line 17—17 of FIG. 16.

Another feature of the present invention involves making a reference plane when a surface plate is not available. This can be done utilizing the present invention. Pipes 400-414 are held together by casting 34 as shown in FIG. 16. These pipes form the lower portion 416 of space frame A shown in FIG. 2. A plurality of jacks 420 located on an uneven floor F are used to support the various pipes and adjust the pipes so that they are level as seen in FIG. 17. This can be done by an appropriate, manual leveling device. Thereafter, casting 34 can be spotted together. After spotting, the lower portion 416 is again measured to determine if it is in a flat plane. If so, the weld joints can be fixed by appropriate weld beads previously described. In this manner, the lower portion 416 of frame A can be used as a level plane to assure proper position of various components on the space frame as components are assembled. Such components include the remaining pipe sections 10.

Figure 18:
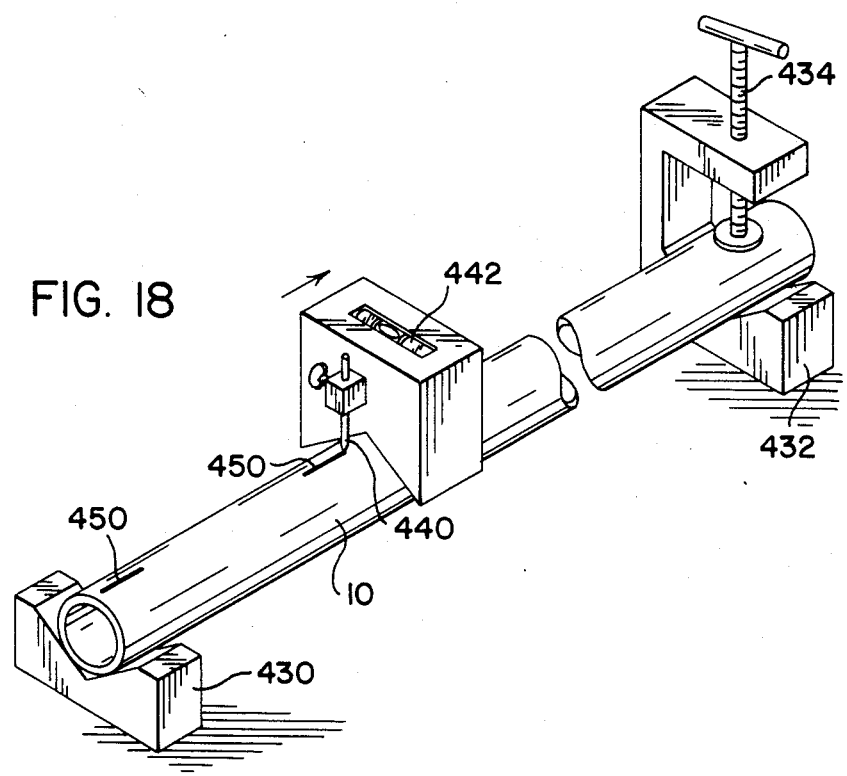
FIG. 18 is a schematic elevational view showing an arrangement for scribing an axially extending line or series of marks along the length of a pipe for the purpose of aligning spaced thin walled castings onto the pipe at axially spaced locations in a manner to produce orientation of the castings.
Figure 19:
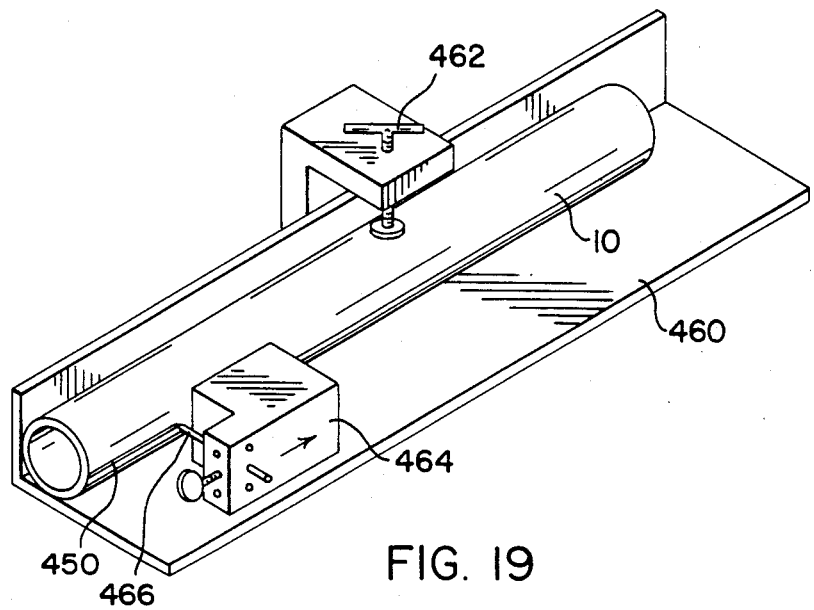
FIG. 19 is a pictorial view showing still a further arrangement for scribing an orientation line axially along a pipe preparatory to aligning spaced thin walled castings on the pipe in the proper angular disposition.
Figure 20:
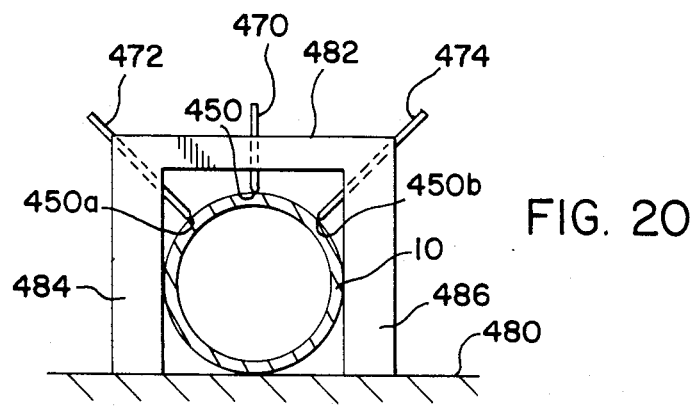
FIG. 20 shows an arrangement for scribing a number of axially extending lines on a pipe which lines are fixed in a circumferential direction for the purposes of aligning castings onto the pipe at precise locations even though the castings are spaced substantially in the axial direction along the pipe.

Referring now to FIGS. 18-23, a novel concept for aligning or orienting the various castings with respect to pipe sections 10 is illustrated schematically. In FIG. 18, pipe 10 is supported in V-blocks 430, 432 and locked in place by an appropriate clamp 434. Scribe 440 is moved along pipe section 10 while bubble level detector 442 remains in the proper position. This device can be used to produce a series of lines or dashes 450a or a single line 450. FIG. 19 illustrates another device for producing orientation line 450 on pipe section 10. An angle plate 460 holds pipe section 10 in place by a clamp 462. An appropriate gauge block 464 having a scribe 466 intersecting pipe section 10 at its center plane is moved along the pipe to make the line 450 at the desired position. If a number of lines are required, an arrangement such as shown in FIG. 20 can be used. In this device, pipe section 10 is clamped onto a plate 480 by an appropriate arrangement, not shown. Lines 450, 450a, and 450b are marked axially along pipe section 10 by scribes 470, 472, 474 held in a sliding, straddle block 482 movable axially along plate 480. The straddle block has legs 484, 486 that engage the outer surface of pipe section 10 for the purpose of scribing lines at the desired circumferentially spaced positions. FIG. 21 illustrates how line 450 can be used. Line 450 coacts with indicia 500, 502, 504 and 506 on castings 22 and 34 to be mounted onto pipe section 10. By using indicia 500, 502, the two pipe sections have a predetermined angular disposition with respect to the circumference of pipe section 10. If a different angle is required, casting 22 can be rotated until indicia 504 or 506 is registered with line 450. Referring now to FIG. 22, pipe section 10 is to be mounted with respect to casting 34 having indicia 510, 511. Pipe 10 can be rotated with respect to the casting at different angles determined by the indicia 510 as it is aligned with one of the lines 450, 450a, and 450b. These lines are at preselected angular disposition for orientation purposes. Indicia 511 on the saddle portion of casting 34 can register with line 450 so that two or more castings 34, at axially spaced positions, can be oriented properly by indicia on the castings and by scribed lines on the surface of the pipe section, in this instance, pipe 152. FIG. 23 shows indicia 512, 514 and 516 on the tubular portion of casting 34. Thus, pipe section 10 can be adjusted to the desired position with respect to the tubular portion. In the saddle portion of casting 34 there are provided indicia 513, 515 and 517 to be registered with line 450 on pipe 152. Casting 34 can be adjusted to the desired angular position with respect to line 450 as determined by instructions in the kit or otherwise in constructing the space frame. The technique illustrated in FIGS. 18–23 allows easy register and orientation of the castings with respect to the pipes without need for complex jig and fixtures.

FIG. 24 shows castings 200 with a designated overlapping portion. Beads 200a, 200b hold pipes 152, 201 together. By using this concept standard pipes with wide dimensional tolerances can be used with castings. There is no need to control the length to obtain the needed junction strength. The bead can be applied after tacking or adhesion to allow individual assembly of joints, instead of total processing of the frame at one time. This is essential to construction of a frame as envisioned by the present invention and is novel.

Figure 25:
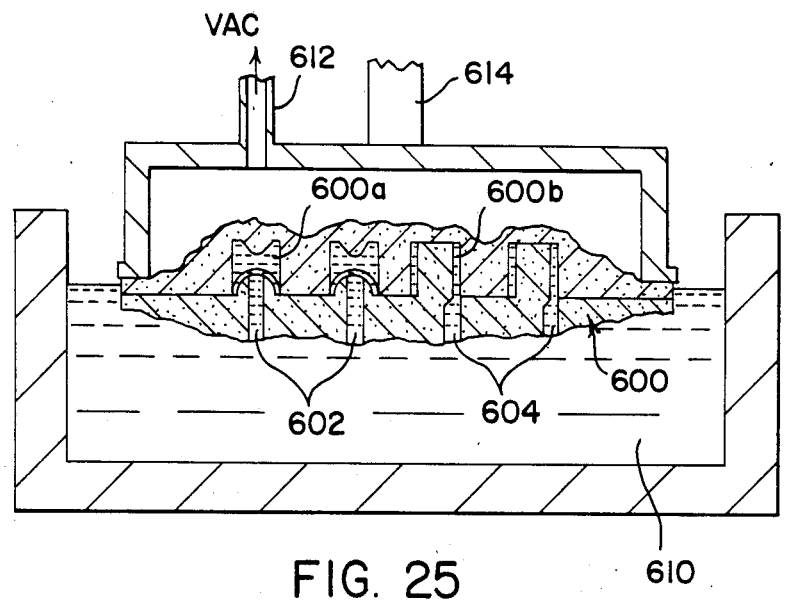
FIG. 25 is a schematic view showing the process employed for making the novel castings in accordance with the invention.

Referring now to FIG. 25, the molding process employed in making castings used in the present invention is illustrated. Mold 600 is shown in U.S. Pat. No. 4,340,108 and is generally described as having a plurality of cavities in a rigid, self supporting gas permeable low temperature bonded, sand grain mold with a number of individual gates 602, 604 extending into molten metal bath 610, as mold 600 is moved downwardly by cylinder rod 614. An appropriate low level vacuum (in the neighborhood of 1.0–3.0 psig) is applied to the top of mold 600 through vacuum line 612. The mold is moved downwardly into the molten bath, at which time the vacuum applied to the top of the mold rapidly draws molten metal into the various internal cavities 600a, 600b, through the individual gates 602, 604. The metal in the gates then freezes and the mold can be removed before the sand material forming the mold actually fails. The metal is not super heated. This casting process produces a fine grain uniform thickness wall for the castings so that they can be used in practicing the present invention.

Figure 26:
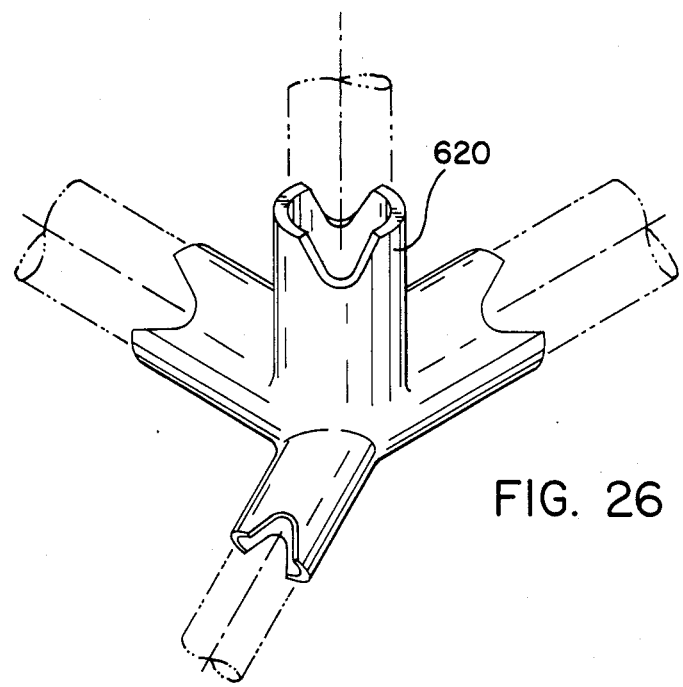
FIG. 26 illustrates a speciality casting which is constructed in accordance with the present invention, but is not adjustable and receives a plurality of pipes shown in phantom lines; and, FIG. 27 is a view similar to FIG. 26 showing the use of non-circular structural members, such as rectangular tubing to illustrate that a variety of uniform cross sectioned shapes could be used in the present invention; however, standard metal pipe is preferred.
Figure 27:
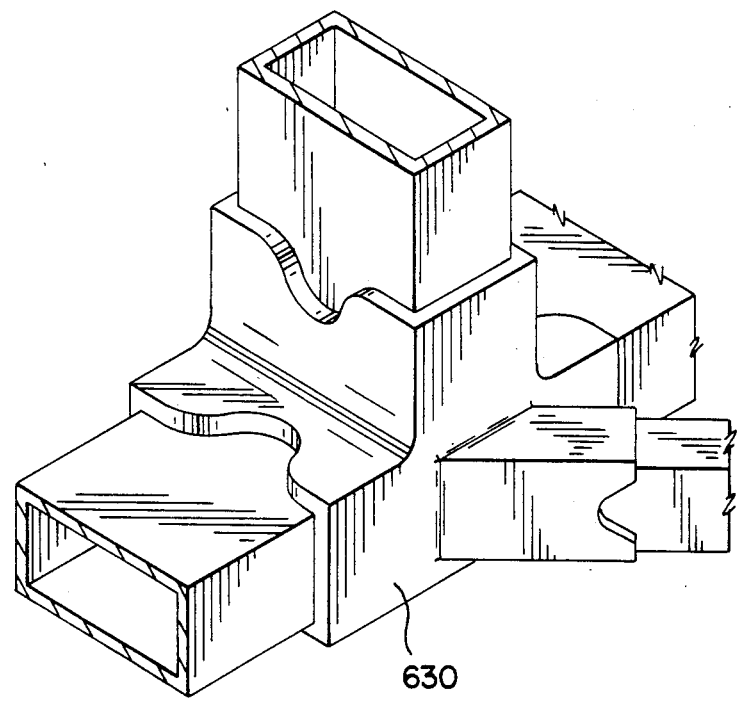

Referring now to FIGS. 26 and 27, complex castings 620, 630 produced in accordance with the process illustrated in FIG. 25 can be used to hold together structural members of the space frame. These castings would be used in high production space frame constructions and are illustrated for the purpose of indicating that complex castings can be used for building space frames for vehicles using the present invention. There can be special castings used at specific joints. FIG. 27 illustrates that the cross sectional shape of the struts or structural members can vary from pipes, which are preferred, to rectangular tubing and other elongated structures.

It is understood that the castings could be constructed with tubular portions extending into the pipe sections 10. The ends of the pipe could be contoured to increase the length of the weld bead, but not for the purpose of controlling the exact length of the pipe or the contour needed to intersect another pipe.

A space frame using the present invention is relatively light, is rigid and is able to conveniently support components and accessories. There is no need for complex cut off or relief portions as required in standard frames. Aluminum and stainless steel, or other equally strong metals, can be used for the castings.

Having thus described the invention, the following is claimed:

1. A remotely constructible, three dimensional space frame for a motor vehicle, said three dimensional space frame comprising: a plurality of elongated, metal structural members with outer surfaces and having axially uniform cross sections; a plurality of thin walled, interconnecting metal castings of at least first and second types, wherein said first and second types of metal castings each have a generally arcuate saddle portion with a contour matching a portion of the cross section of said structural members and laterally engageable with one of said structural members for axial movement of the casting therein and a receptacle with an elongated tubular portion having a cross section matching said cross sections and intersecting with said saddle portion at a given angle whereby said casting can be moved axially along one of said structural members and can receive another of said structural members movable axially into said tubular portion so that said one and another structural members are held with respect to each other at said given angle, said saddle portion and said tubular portion each having outer peripheral edges generally coplanar with the outer surfaces of said one and another of said structural members; and, a welded bead along said outer peripheral edges and between said edges and said structural members.

2. A vehicle space frame as defined in claim 1 wherein said given angles of said first and said second types of castings are different and the given angle of said first type casting is 90°.

3. A vehicle space frame as defined in claim 1 wherein said castings have wall thicknesses of less than about 0.20 inches.

4. A vehicle space frame as defined in claim 3 wherein said castings have wall thicknesses of less than about 0.10 inches.

5. A vehicle space frame as defined in claim 1 wherein said cross sections of said structural members is cylindrical and said structural members are hollow pipes.

6. A vehicle space frame as defined in claim 5 wherein said castings have wall thicknesses of less than about 0.20 inches.

7. A vehicle space frame as defindd in claim 1 wherein said peripheral edge of said receptacle portion of at least one type of casting is substantially greater in length than the line of intersection of a flat plane with said element in said receptacle portion whereby the length of said welded bead at said peripheral edge is increased.

8. A vehicle space frame as defined in claim 5 wherein said peripheral edge of said receptacle portion of at least one type of casting is substantially greater in length than the line of intersection of a flat plane with said element in said receptacle portion whereby the length of said welded bead at said peripheral edge is increased.

9. A vehicle space frame as defined in claim 1 wherein said castings have a generally uniform wall thickness throughout.

10. A vehicle space frame as defined in claim 5 including a plurality of a third type of thin walled, interconnecting metal castings to be used in pairs, wherein said third type of castings each has a generally arcuate saddle portion with a peripheral edge transversely engageable at a right angle with one of said pipe structural members and an elongated tubular portion with a cross section matching but slightly larger than another of said pipe structural members and extending in a direction axial of said peripheral edge of said saddle portion whereby a pair of said third castings can be, before welding, rotated around said one pipe structural member with said other pipe structural member in said tubular portions remaining orthogonal to said one pipe structural member and each of said paired third type castings having an abutting area at said saddle portion which abutting area can be trimmed when mounting said pair of said third type castings on a single pipe structural member to form a three pipe frame junction with an adjusted angle between the pipe members extending from said tubular portions of said third casting.

11. A vehicle space frame as defined in claim 10 including a fourth type thin walled, interconnecting casting having a saddle portion with an arcuate cross section engaged with said pair of third type castings making said three pipe frame junction and a tubular portion with a cross section matching, but slightly larger than the cross section of one of said structural pipe members whereby said fourth casting coacts with said pair of third castings to form a four pipe frame junction.

12. A vehicle space frame as defined in claim 1 wherein said tubular portions of said first and second type of castings have different cross section sizes.

13. A vehicle space frame as defined in claim 12 wherein said cross sections of said structural members are cylindrical and said structural members are hollow pipes.

14. A vehicle space frame as defined in claim 1 wherein said castings are cast by drawing molten metal into a cavity of a rigid, self supporting, gas permeable low temperature bonded, sand grain mold by a vacuum applied through said sand mold while said mold is partially submerged in said molten metal.

15. A vehicle space frame as defined in claim 14 wherein said molten metal is stainless steel.

16. A vehicle space frame as defined in claim 14 wherein said castings have a generally uniform wall thickness throughout.

17. A vehicle space frame as defined in claim 16 wherein said castings have wall thicknesses of less than about 0.20 inches.

18. A thin walled metal casting for interconnecting elongated metal structural members in a three dimensional vehicle space frame, said casting having a first portion adapted to move along one of said structural members and a second tubular portion to receive another of said structural members axially of said casting and each of said first and second portions having a weld bead receiving edge for mutually joining said first portion to said one structural member and said another structural member onto said casting.

19. A vehicle space frame as defined in claim 18 wherein said casting is cast by drawing molten metal into a cavity of a rigid, self supporting, gas permeable low temperature bonded, sand grain mold by a vacuum applied through said sand mold while said mold is partially submerged in said molten metal.

20. A vehicle space frame as defined in claim 19 wherein said molten metal is stainless steel.

21. A vehicle space frame as defined in claim 19 wherein said casting has a wall thickness of less than about 0.20 inches.

22. A vehicle space frame as defined in claim 21 wherein said casting has a wall thickness of less than about 0.10 inches.

23. A vehicle space frame as defined in claim 22 wherein said castings have a generally uniform wall thickness throughout.

24. A vehicle space frame as defined in claim 19 wherein said castings have a generally uniform wall thickness throughout.

25. A vehicle space frame as defined in claim 18 wherein said castings have a generally uniform wall thickness throughout.

26. A thin walled metal casting for interconnecting elongated metal structural members into a three dimensional vehicle space frame, said structural members having outer axial surfaces and said casting having at least a first tubular portion to receive one of said structural members in an axial direction and a second portion adapted to be mounted on other of said metal structural members, said first and second portions of said casting each having peripheral edges lying along said outer surface of one of said structural members and forming a weld bead path for joining said casting with said structural members.

27. A casting as defined in claim 26 wherein said outer periphery of said tubular portion has a length greater than the length of an intersection line defined by said outer surface and a plane perpendicular to said structural member to be welded into said tubular portion.

28. A vehicle space frame as defined in claim 27 wherein said casting is cast by drawing molten metal into a cavity of a rigid, self supporting, gas permeable low temperature bonded, sand grain mold by a vacuum applied through said sand mold while said mold is partially submerged in said molten metal.

29. A vehicle space frame as defined in claim 28 wherein said molten metal is stainless steel.

30. A vehicle space frame as defined in claim 27 wherein said casting has wall thicknesses of less than about 0.20 inches.

31. A vehicle space frame as defined in claim 28 wherein said castings have a generally uniform wall thickness throughout.

32. A vehicle space frame as defined in claim 26 wherein said casting is cast by drawing molten metal into a cavity of a rigid, self supporting, gas permeable low temperature bonded, sand grain mold by a vacuum applied through said sand mold while said mold is partially submerged in said molten metal.

33. A vehicle space frame as defined in claim 32 wherein said molten metal is stainless steel.

34. A vehicle space frame as defined in claim 33 wherein said castings have a generally uniform wall thickness throughout.

35. A vehicle space frame as defined in claim 32 wherein said castings have a generally uniform wall thickness throughout.

36. A three dimensional space frame comprising: a plurality of elongated metal structural members with outer surfaces and having axially uniform cross sections; a plurality of thin walled, interconnecting metal castings of at least first and second types, wherein said first and second types of metal castings each have a generally arcuate saddle portion with a contour matching a portion of the cross section of said structural members and laterally engageable with one of said structural members for axial movement of the casting therein and a receptacle with an elongated tubular portion having a cross section matching said cross sections and intersecting with said saddle portion at a given angle whereby said casting can be moved axially along one of said structural members and can receive another of said structural members movable axially into said tubular portion so that said one and another structural members are held with respect to each other at said given angle, at least said saddle portion having an outer peripheral edge generally coplanar with the outer surfaces of said one structural member; and, a welded bead along said outer peripheral edge and between said edge and said one structural member.

37. A space frame as defined in claim 36 wherein said castings have wall thicknesses of less than about 0.20 inches.

38. A space frame as defined in claim 36 wherein said castings are cast by drawing molten metal into a cavity of a rigid, self supporting, gas permeable low temperature bonded, sand grain mold by a vacuum applied through said sand mold while said mold is partially submerged in said molten metal.

39. A space frame as defined in claim 38 wherein said molten metal is stainless steel.

40. A vehicle space frame as defined in claim 38 wherein said castings have a generally uniform wall thickness throughout.

41. A vehicle space frame as defined in claim 40 wherein said castings have wall thicknesses of less than about 0.20 inches.

42. A thin walled metal castings for interconnecting elongated metal structural members into a three dimensional vehicle frame, said structural members having outer axial surfaces and said casting having at least a first tubular portion to receive one of said structural members in an axial direction and a second portion adapted to be mounted on other of said metal structural members, and said casting being cast by drawing molten metal into a cavity of a rigid, self-supporting, gas permeable low temperature bonded, sand grain mold by a vacuum applied through said sand mold while said mold is partially submerged in said molten metal.

43. A casting as defined in claim 42, wherein said molten metal is stainless steel.

44. A casting as defined in claim 42, wherein said casting has wall thicknesses of less than about 0.20 inches.

45. A casting as defined in claim 42, wherein said castings have a generally uniform wall thickness throughout.

46. A casting as defined in claim 42, wherein said second portion is a second tubular portion to receive another of said structural members.

47. A casting as defined in claim 42, wherein said vehicle frame is a space frame.

* * * * *